Patented Mar. 27, 1923.

1,449,423

UNITED STATES PATENT OFFICE.

ALEXANDER LOWY AND ARTHUR MARK HOWALD, OF PITTSBURGH, PENNSYLVANIA.

PRODUCTION OF NAPHTHYL AMINES.

No Drawing.   Application filed April 1, 1922.   Serial No. 548,846.

*To all whom it may concern:*

Be it known that we, ALEXANDER LOWY and ARTHUR MARK HOWALD, citizens of the United States, and residents of Pittsburgh, in the county of Allegheny and State of Pennsylvania, have invented certain new and useful Improvements in the Production of Naphthyl Amines, of which the following is a specification.

This invention relates to a process for producing naphthyl amines from naphthols. It relates more particularly to the production of β-naphthyl amine and β-dinaphthyl amine by the action af ammonia, either alone or mixed with diluents, upon β-naphthol in the vapor phase in the presence of a catalyzer.

This invention may be practised by subjecting β-naphthol in the vapor state mixed with ammonia, with or without the addition of inert gases, to a suitable temperature in the presence of an oxide of aluminum, or other compounds of aluminum. By suitably regulating the conditions, such as the ratio of the reactants, temperature, pressure, presence of diluents, and operating with the proper catalyst, the reaction can be controlled to produce variable amounts of β-naphthyl amine and β-dinaphthyl amine.

The following equations are suggested as representing the reactions which take place, though it is not desired to limit the operation to any particular theory. The equations are given to explain the reactions as indicated by the results obtained.

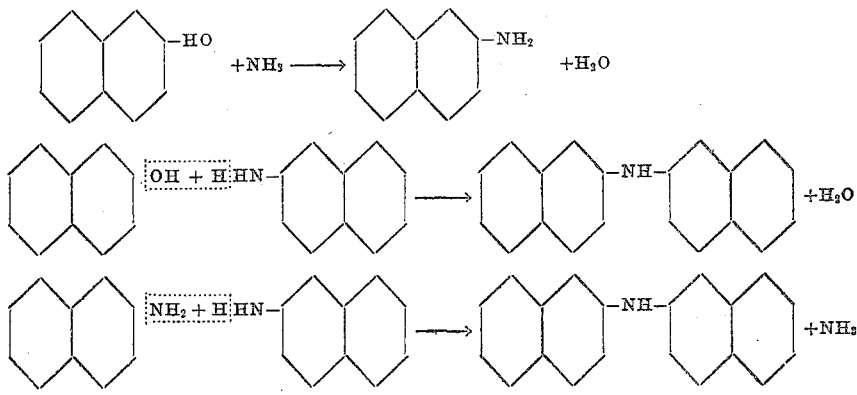

The catalyst may be aluminum oxide, such as $Al_2O_3$, or other compounds of aluminum, and may be distributed upon any convenient carrier, such as pumice, quartz, asbestos, etc. It is preferable to introduce the catalyst or the carrier containing same into tubes or containers through which the mixture of β-naphthol vapor and ammonia containing gas is passed. The tubes or containers containing the catalyst are heated in any convenient manner to a suitable temperature.

The invention will be explained in connection with the following example which is given for illustrative purposes. It is not intended to limit the procedure to the exact details given as the process can be varied throughout wide limits without departing from the spirit and scope of the invention.

A mixture of β-naphthol in the vapor state and ammonia is passed through tubes heated from 300° C. to 550° C.; the tubes containing aluminum oxide deposited on crushed pumice, with the result that β-naphthyl amine and β-dinaphthyl amine are produced. Instead of introducing pure ammonia, it may be diluted with inert gases; the temperature may be varied between about 300° C. and 550° C.; the catalyzer may be deposited on crushed pumice or other suitably powdered, granulated or fibrous material which is chemically inactive and acts merely as a mechanical distributer; the rate at which the vapor is passed through may be regulated to suit the needs; the tubes may be varied in length or diameter, or confined spaces other than tubes may be used in which to place the catalyzer; instead of aluminum oxide, other compounds of aluminum may be used as the catalyzer. It is essential that hot β-naphthol in a vapor state shall come in contact with the catalyzer in the presence of ammonia for the proper reaction to take place. The pressure may be varied throughout quite wide ranges, say from slightly below atmospheric up to several atmospheres, with satisfactory results.

The same reactions take place when mixtures of α-naphthol and β-naphthol and ammonia are passed over the heated catalyzer, thereby producing their respective amines.

After the products of the reaction have passed out of the reaction zone, the condensable portions of the same may be condensed and separated by the usual manner for the recovery of β-naphthyl amine and β-dinaphthyl amine. While the uncondensed gases may be either absorbed in a suitable solvent, such as water, or recirculated through the reaction zone.

In carrying out these reactions we do not limit ourselves to aluminum oxide, or aluminum compounds, for other catalysts, especially the oxides of metals, namely, titania, thoria, etc., produce the same results.

What we claim is:

1. The herein described process, which comprises subjecting the vapors of β-naphthol to the action of ammonia containing gases in the presence of aluminum oxide as a catalyzer at a temperature between 300° C. to 550° C.

2. The herein described process, which comprises subjecting the vapors of β-naphthol to the action of ammonia containing gases in the presence of such a catalyzer that water is evolved from the reacting substances and amines are produced.

3. The herein described process, which comprises passing a mixture of β-naphthol vapors and ammonia through a hot reaction zone, which contains an oxide of aluminum maintained at a temperature of between 300° C. to 550° C. whereby a β-naphthyl amine is produced.

4. The herein described process, which comprises passing a mixture of beta-naphthol vapors and ammonia through a hot reaction zone, which contains an oxide of aluminum maintained at a temperature of between 300° to 550° C., whereby beta dinaphthyl amine is produced.

5. The herein described process, which comprises passing a mixture of beta-naphthol vapors and ammonia containing gases, through a hot reaction zone, which contains an oxide of aluminum maintained at a temperature of between 300° to 550° C., whereby beta dinaphthyl amine is produced.

Signed at Pittsburgh, in the county of Allegheny and State of Pennsylvania, this 29th day of March, A. D. 1922.

ALEXANDER LOWY.
ARTHUR MARK HOWALD.